(12) United States Patent
Silvera et al.

(10) Patent No.: US 8,146,071 B2
(45) Date of Patent: Mar. 27, 2012

(54) PIPELINED PARALLELIZATION OF MULTI-DIMENSIONAL LOOPS WITH MULTIPLE DATA DEPENDENCIES

(75) Inventors: Raul Esteban Silvera, Woodbridge (CA); Priya Unnikrishnan, Toronto (CA)

(73) Assignee: International Business Machines Corporation, Armonk, NY (US)

(*) Notice: Subject to any disclaimer, the term of this patent is extended or adjusted under 35 U.S.C. 154(b) by 1211 days.

(21) Appl. No.: 11/857,211

(22) Filed: Sep. 18, 2007

(65) Prior Publication Data

US 2009/0077545 A1 Mar. 19, 2009

(51) Int. Cl.
*G06F 9/45* (2006.01)
(52) U.S. Cl. .................................. 717/160; 717/150
(58) Field of Classification Search .................. 717/160, 717/150
See application file for complete search history.

(56) References Cited

U.S. PATENT DOCUMENTS

| | | | |
|---|---|---|---|
| 5,781,787 A | 7/1998 | Shafer et al. | |
| 5,852,734 A * | 12/1998 | Komatsu et al. | 717/156 |
| 7,571,301 B2 * | 8/2009 | Kejariwal et al. | 712/215 |
| 2007/0169057 A1* | 7/2007 | Silvera et al. | 717/160 |

OTHER PUBLICATIONS

Ishizaki and Komatsu, A Loop Parallelization Algorithm for HPF Compilers, Lecture Notes in Computer Science, vol. 1033, pp. 176-190 (1996).*
Chen and Yew, Redundant Synchronization Elimination for DOACROSS Loops, IEEE Transactions on Parallel and Distributed Systems, vol. 10, No. 5, pp. 459-470 (May 1999).*
Chao et al., "Minimizing Redundant Dependencies and Interprocessor Synchronizations," p. 1-21, School of Electrical Engineering, Purdue University, Oct. 1994.

* cited by examiner

*Primary Examiner* — Lewis A Bullock, Jr.
*Assistant Examiner* — Kevin Dothager
(74) *Attorney, Agent, or Firm* — Yee & Associates, P.C.; David A. Mims, Jr.

(57) ABSTRACT

A mechanism for folding all the data dependencies in a loop into a single, conservative dependence. This mechanism leads to one pair of synchronization primitives per loop. This mechanism does not require complicated, multi-stage compile time analysis. This mechanism considers only the data dependence information in the loop. The low synchronization cost balances the loss in parallelism due to the reduced overlap between iterations. Additionally, a novel scheme is presented to implement required synchronization to enforce data dependences in a DOACROSS loop. The synchronization is based on an iteration vector, which identifies a spatial position in the iteration space of the loop. Multiple iterations executing in parallel have their own iteration vector for synchronization where they update their position in the iteration space. As no sequential updates to the synchronization variable exist, this method exploits a greater degree of parallelism.

20 Claims, 6 Drawing Sheets

FIG. 3

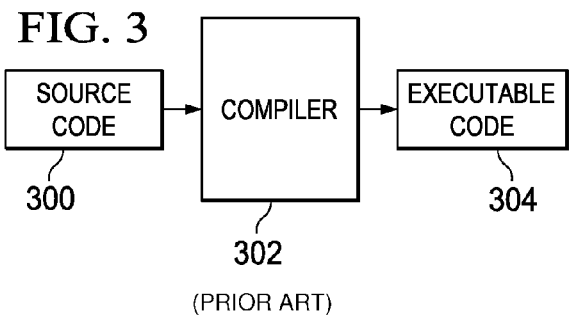

(PRIOR ART)

FIG. 4

Algorithm 1: WAIT algorithm

400 — Input: The iteration vector of the dependence source $wI_v = (I_1 - d_1; I_2 - d_2; \ldots; I_n - d_n)$, n = dimension of loop, m = number of threads 402 —
```
begin
    // Determine the thread executing the source iteration specified by wl_v
    // iterations are assigned using a static schedule with chunksize = 1
    src_thd = wI_v[1] % m
        while wI_v[1...n] > syncI_v[src_thd][1...n] do
         └ wait
end
```

FIG. 5

Algorithm 2: POST algorithm

500 — Input: The iteration vector of the current iteration $pI_v = (I_1, I_2, \ldots, I_n)$, n = dimension of loop, m = number of threads 502 —
```
begin
    curr_thd = mythread( )
    // update the synchronization variable of the current thread
    syncI_v[curr_thd][1...n] = pI_v[1...n]
end
```

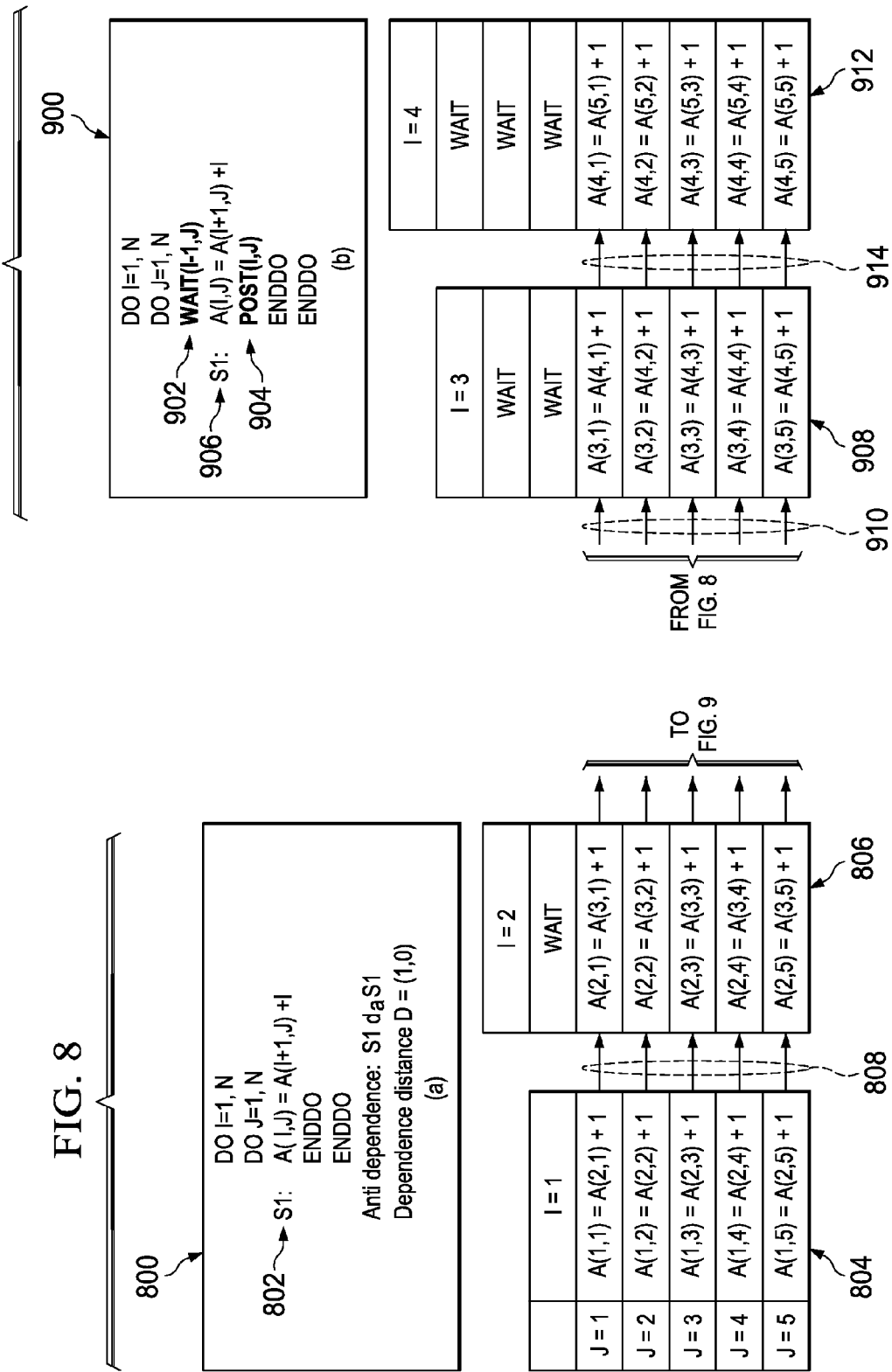

FIG. 10

```
              DO I=4, N
              DO J=4, N
       S1:    A(I,J) = B(I,J) + C(I,J)
       S2:    D(I,J) = A(I-2,J-1) + E(I,J)
       S3:    E(I,J) = A(I-4,J-4) + C(I,J)
       S4:    F(I,J) = D(I-3,J) + 1
              ENDDO
              ENDDO
                (a)
```

FIG. 11

```
              DO I=4, N
              DO J=4, N
       S1:    A(I,J) = B(I,J) + C(I,J)
              WAIT( I-1, J-4)
       S2:    D(I,J) = A(I-2,J-1) + E(I,J)
              POST(I,J)
       S3:    E(I,J) = A(I-4,J-4) + C(I,J)
       S4:    F(I,J) = D(I-3,J) + 1
              ENDDO
              ENDDO
                (b)
```

PIPELINED PARALLELIZATION OF MULTI-DIMENSIONAL LOOPS WITH MULTIPLE DATA DEPENDENCIES

BACKGROUND OF THE INVENTION

1. Field of the Invention

The present invention relates generally to an improved data processing system and in particular to the compilation of computer usable program code. Still more particularly, the present invention relates to a method for the pipelined parallelization of multi-dimensional loops with multiple data dependencies.

2. Description of the Related Art

Many modern computers are capable of performing parallel processing. Parallel processing is the simultaneous use of more than one processor to execute a program. Parallel processing differs from multitasking in that, in multitasking, a single processor executes more than one program simultaneously. Parallel processing can be achieved by using multiple processors in a single computer, or by using multiple computers connected in a network. This latter type of parallel processing uses distributed software to create the effect of multiple parallel processors in a single computer.

In either case, the goal of parallel processing is to make programs run faster by having multiple processors executing the program at the same time. In practice, writing or dividing a program in such a way that separate processors can execute different portions of the program is difficult. The difficulty arises because the various processors can interfere with each other with respect to execution of the program.

Many computer programs contain loops which are taken into account when determining how to perform parallel processing with respect to the computer programs. A loop is a program or subroutine that executes multiple times, often iteratively, until some desired result occurs or some time passes. Loops are a large potential source of parallelism in computer programs. Ideally, multiple processors should perform different iterations of a loop simultaneously in order to increase the speed at which the loop processes.

For example, a particular loop contains twenty iterations. If twenty processors simultaneously perform one different iteration of the loop, the entire loop can be processed much more quickly than if a single processor alone had performed all twenty loops.

One method of allowing a computer program with loops to take advantage of parallel processing is to compile the program to exploit available parallel processing power. A compiler is a computer program that translates a series of program instructions written in a source computer language into program instructions written in a target computer language, or otherwise modifies the code of the source code. In an example, a compiler can change the code of the original source program to better take advantage of available parallel processing power.

However, commercial compilers are lacking with regard to exploitation of parallelism available in loops. Most compilers are limited to automatically parallelizing DOALL loops. A DOALL loop is a loop that has no data dependencies. In contrast, a DOACROSS loop is a loop that has at least one cross iteration data dependency. Available compilers serialize DOACROSS loops because of a major problem associated with parallelizing DOACROSS loops.

The main problem with parallelizing DOACROSS loops is the synchronization operations involved. Synchronization operations are generally very expensive. Using synchronization excessively or carelessly can result in severe performance degradation. This performance degradation defeats the purpose of parallel processing and of compiling the program; thus, available compilers simply do not parallelize DOACROSS loops. As a result, a higher degree of program performance cannot be achieved by using available compilers with respect to programs having DOACROSS loops.

SUMMARY OF THE INVENTION

The aspects of the present invention provide for a computer implemented method, apparatus, and computer usable program code for preparing a loop in a set of loops in computer code for parallel processing. The loop is identified by identifying which loop in the set of loops will, during execution thereof, have an iteration vector bounded by an iteration space of the loop, wherein all data dependencies are contained within the loop. Each data dependency is represented as a corresponding dependency vector $D^k$ having elements ($d^k_1$, $d^k_2$, ... $d^k_n$), wherein a set of dependency vectors are formed. The set of dependency vectors is used to compute a result vector C having elements $c_1, c_2, \ldots c_n$). For each corresponding dependency vector in the set dependency vectors that satisfies the equation:

$$\vec{C} = \begin{pmatrix} C[1] \\ C[2 \ldots n] \end{pmatrix}$$
$$= \begin{pmatrix} gcd(d_1^1, d_1^2, \ldots d_1^k) \\ \max\_vect(D^1[2 \ldots n], D^2[2 \ldots n], \ldots D^k[2 \ldots n]) \end{pmatrix}$$

a call to a WAIT(wI) primitive is inserted into the loop immediately prior to a lexically earliest sink statement in the loop. "I" will represent a current value of the loop iteration vector for the loop. (wI) is computed as wI=(I−C). Invocation of the WAIT(wI) primitive, where (WI) is within the iteration space of the loop, will, during execution of the loop, cause a first thread which processed the WAIT(wI) instruction to suspend until invocation by a second thread of a POST(pI) primitive for which pI is equal to or greater than (wI) for a value of (wI) for which the WAIT(wI) primitive was invoked by the first thread. Invocation of the WAIT(wI) primitive, where (wI) is outside the iteration space of the loop, will be ignored. The POST(pI) primitive is inserted into the loop immediately following a lexically latest source statement in the loop, wherein pI=I.

In another illustrative example, the WAIT(wI) primitive will, when invoked during execution of the loop, check a thread iteration vector for the second thread. In this case, the value of the thread iteration vector for the second thread will, during execution of the loop, be stored by invocation of the POST(pI) primitive by the second thread. Additionally, the WAIT(wI) primitive will, responsive to a determination during execution of the loop that the thread iteration vector for the second thread is equal to or greater than the value of (wI) for which the WAIT(wI) primitive was invoked by the first thread, permit the first thread to resume execution of the loop.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 is a block diagram of a prior art compiler, in which the present invention may be implemented;

FIG. 4 is an exemplary WAIT algorithm, in accordance with an illustrative embodiment;

FIG. 5 is an exemplary POST algorithm, in accordance with an illustrative embodiment;

FIG. 8 is a multi-dimensional loop, in which aspects of the present invention may be incorporated;

FIG. 9 illustrates pipelined parallelization of the multi-dimensional loop of FIG. 8, in accordance with an illustrative embodiment;

FIG. 10 is a two-dimensional DOACROSS loop having multiple flow dependencies, in which aspects of the present invention may be incorporated;

FIG. 11 illustrates the synchronization primitives inserted into the two-dimensional DOACROSS loop shown in FIG. 10, in accordance with an illustrative embodiment;

DETAILED DESCRIPTION OF THE PREFERRED EMBODIMENT

Figure 1:
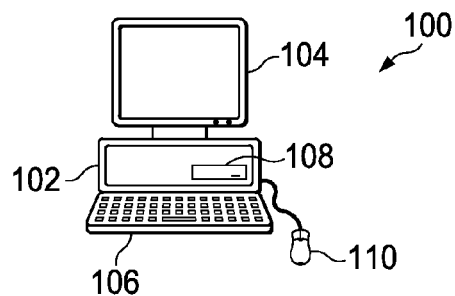
FIG. 1 is a pictorial representation of a data processing system in which the aspects of the present invention may be implemented.

With reference now to the figures and in particular with reference to FIG. 1, a pictorial representation of a data processing system is shown in which the aspects of the present invention may be implemented. Computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 may be any suitable computer, such as an IBM® eServer™ computer or IntelliStation® computer, which are products of International Business Machines Corporation, located in Armonk, N.Y. Although the depicted representation shows a personal computer, other embodiments of the present invention may be implemented in other types of data processing systems, such as a network computer. Computer 100 also preferably includes a graphical user interface (GUI) that may be implemented by means of systems software residing in computer readable media in operation within computer 100.

Figure 2:
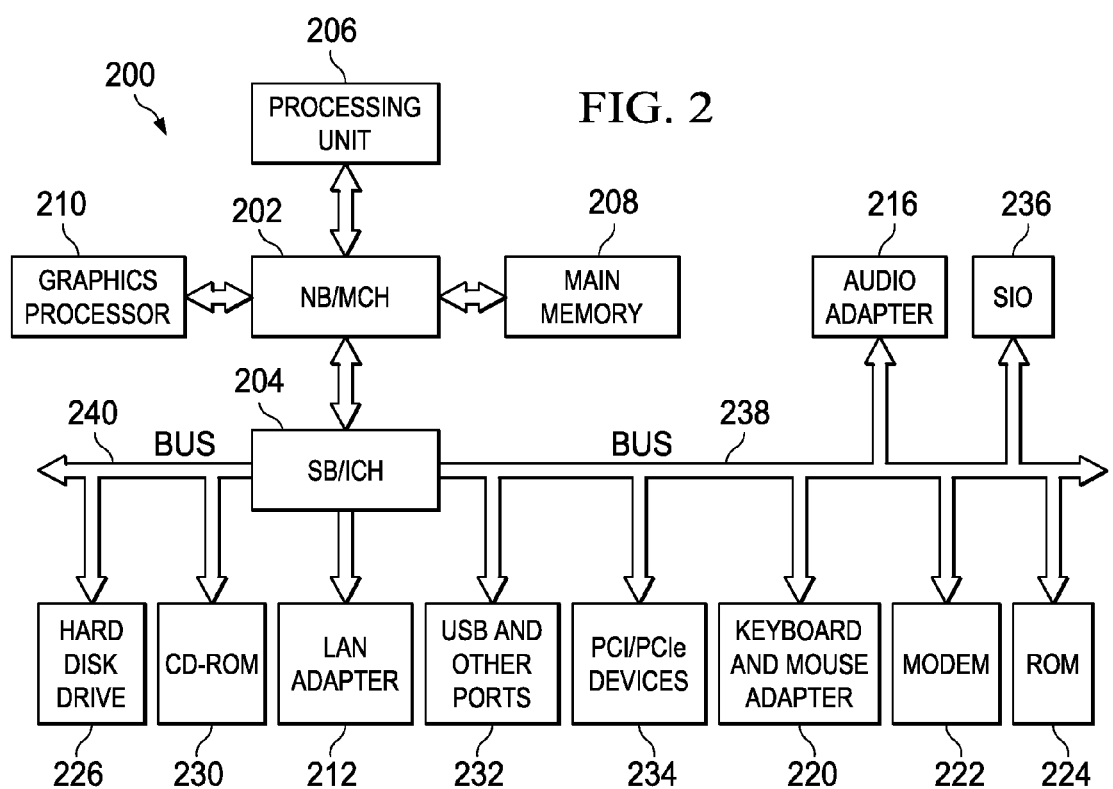
FIG. 2 is a block diagram of a data processing system in which aspects of the present invention may be implemented.

With reference now to FIG. 2, a block diagram of a data processing system is shown in which aspects of the present invention may be implemented. Data processing system 200 is an example of a computer, such as computer 100 in FIG. 1, in which code or instructions implementing the processes of the present invention may be located. In the depicted example, data processing system 200 employs a hub architecture including a north bridge and memory controller hub (MCH) 202 and a south bridge and input/output (I/O) controller hub (ICH) 204. Processor 206, main memory 208, and graphics processor 210 are coupled to north bridge and memory controller hub 202. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processor 206 and coordinates and provides control of various components within data processing system 200 in FIG. 2. The operating system may be a commercially available operating system, such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 200 (Java and all Java-based trademarks are trademarks of Sun Microsystems, Inc. in the United States, other countries, or both).

Instructions for the operating system, the object-oriented programming system, and applications or programs are located on storage devices, such as hard disk drive 226, and may be loaded into main memory 208 for execution by processor 206. The processes of the present invention may be performed by processor 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the present invention may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course, the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache, such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

The aspects of the present invention provide for a computer implemented method, apparatus, and computer usable program code for compiling source code. The methods of the present invention may be performed in a data processing system, such as data processing system 100 shown in FIG. 1, or data processing system 200 shown in FIG. 2.

As used herein, the following terms have the following meanings:

A "compiler" is a computer program that translates a series of program instructions written in a source computer language into program instructions written in a target computer language, or otherwise modifies the code of the source code. A "compiler" can also be an "optimizing compiler."

An "optimizing compiler" is a computer program that modifies program source code in order to generate executable code that makes efficient use of the hardware resources available on the target machine. The word "optimization" and related terms are terms that refer to improvements in speed, size, and/or efficiency of a computer program, and do not purport to indicate that a computer program has achieved, or is capable of achieving, an "optimal" or perfectly speedy/perfectly efficient state.

A "DOALL" loop in a computer program is a loop that does not contain data dependencies.

A "DOACROSS" loop in a compute program is a loop that has at least one cross iteration data dependency.

A "data dependency" can be expressed as $\Delta = \{S_{src} \delta^* S_{sink}, \vec{D}\}$, which has two parts: 1) source and sink statements and 2) dependence distance. The following notations indicate the types of data dependencies: $\delta^f$ (flow dependence), $\delta^a$ (anti-dependence), and $\delta^o$ (output-dependence).

FIG. 3 is a block diagram of a known compiler. Source code 300 is created by one or more of a number of known techniques, such as automatically, or by a human programmer. Compiler 302 and executable code 304 are computer usable programs that can be used in a data processing system, such as data processing system 100 in FIG. 1, or data processing system 200 in FIG. 2.

Source code 300 defines how a program will eventually operate, but source code 300 is usually not in a desired format for execution on a data processing system. Instead, source code 300 is often in a format that is easier for a human to interpret. After source code 300 has been defined, source code 300 is provided to compiler 302. A typical compiler is a computer program that translates a series of statements written in a first computer language, such as source code 300, into a second computer language, such as executable code 304. The second computer language, such as executable code 304, is often called the object or target language.

Thus, compiler 302 is, itself, a computer program designed to convert source code 300 into executable code 304. After compiler 302 has performed its programmed actions on source code 300, compiler 302 outputs executable code 304. Executable code 304 is generally in a desired computer-usable format and is ready for use in a data processing system.

Typical compilers output objects that contain machine code augmented by information about the name and location of entry points and external calls to functions not contained in the object. A set of object files, which need not have come from a single compiler provided that the compilers used share a common output format, may then be linked together to create the final executable code. The executable code can then be run directly by a user.

Most compilers translate a source code text file, written in a high level language, to object code or machine language, such as into an executable .EXE or .COM file that may run on a computer or a virtual machine. However, translation from a low level language to a high level language is also possible. Such a compiler is normally known as a decompiler if the compiler is reconstructing a high level language program which could have generated the low level language program. Compilers also exist which translate from one high level language to another high level language, or sometimes to an intermediate language that still needs further processing.

Known Past Attempts to Parallelize Loops

Attempts have been made to create synchronization methods for pipelined parallelization. Most of the existing methods use a multi stage process for pipelined parallelization. First, separate synchronization instructions are inserted for every data dependence relation in a loop. The next step uses the concept of dependence coverage to reduce the number of synchronization instructions in the loop. Dependencies that are covered by other dependencies are identified. Then, synchronization instructions for covered dependencies are eliminated.

However, these methods require complicated and in-depth compile-time analysis of the program structure to reduce synchronization overhead. An additional drawback of these methods is that, even after eliminating redundant synchronization, a large number of synchronization instructions could remain. Performance degradation could result, which vitiates the purpose of the method. Moreover, no quantitative results about the performance of the known solutions are available.

Another method presents a mechanism that uses integer programming to determine the optimal amount of synchronization. However, this technique only applies to singly-nested loops.

Another known method explores synchronization strategies for one-dimensional loops. A single, compiler-generated integer synchronization variable is generated per data dependency. The iterations executing in parallel update the synchronization variable with the iteration number. All the iterations share the same synchronization variable. Furthermore, updates to the synchronization variable are performed sequentially. The memory requirement for this method is small; however, the sequential updates severely restrict parallelism.

A second method uses an array of bits, where the size of the array is equal to the size of the iteration space. This method allows for all the parallelism in the loop to be exploited. However, the drawback to this method is the large amount of space consumed by the array of bits. This problem makes impossible the application of this method to multi-dimensional loops with large or unknown iteration counts.

In another known attempt, a data-oriented scheme uses one dedicated sync variable for each datum that needs ordering. This scheme requires a large number of keys. Initializing these keys can result in significant overhead and attending reduction in performance. In the statement-oriented scheme, each statement of the loop is assigned a synchronization variable. The variable is shared among the iterations executing in parallel. Updates to the synchronization variable are sequential, resulting in loss of parallelism. Additionally, the process-oriented scheme uses a small set of synchronization variables. Each iteration running in parallel has one synchronization variable which consists of two pieces of information, the "iteration" number and the "step." The "step" is updated after the completion of each source statement in the loop.

This method does not have the drawbacks of the other schemes, and works well for one-dimensional loops. However, this method becomes intractably complex as the number of dimensions in the loop increase, because this scheme uses only one synchronization variable per iteration. The "step" needs to be updated correctly in multi-dimensional loops. This method is also complicated in that this method uses several primitives to reuse and manage the ownership of the fixed number of synchronization variables.

Another method generates synchronization code based directly on array subscripts. This method does not require constant dependency distances. However, the drawback to this method is that the synchronization code can become unnecessarily complex because the method is dependent on the complexity of the array subscripts. Because the synchronization is based on the array subscripts, folding multiple dependencies into a single dependency can be complicated and sometimes impossible. This result could create a situation where all the dependencies in the loop need to be separately enforced. This method is complex and unwieldy. Additionally, this method requires synchronization of each data dependency individually, which results in unnecessary overhead and undesirable performance degradation.

Advances Over the Known Art

The aspects of the present invention provide for a computer implemented method, apparatus, and computer usable program code for the pipelined parallelization of multi-dimensional loops with multiple data dependencies. The aspects of the present invention can be implemented in a compiler, such as compiler 302 of FIG. 3. The aspects of the present invention can be implemented in a data processing system, such as data processing system 100 in FIG. 1, or data processing system 200 in FIG. 2.

The aspects of the present invention provide for pipelining the execution of DOACROSS loops using explicit synchronization to enforce data dependencies. This discovery opens up opportunities for parallelization of computer programs when compared to the limited performance and scalability achievable by only parallelizing DOALL loops.

The aspects of the present invention provide a simple, efficient synchronization mechanism for pipelining perfectly nested multi-dimensional loops. This mechanism is efficient in terms of memory requirements. Additionally, this mechanism does not place any restrictions on parallelism. The aspects of the present invention apply to nested DOACROSS loops with a single level of parallelization where inner loops are executed sequentially.

The aspects of the present invention provide for a mechanism for folding all the data dependencies in a loop into a single, conservative dependence. This mechanism leads to one pair of synchronization primitives per loop. This mechanism does not require complicated, multi-stage compile time analysis. This mechanism considers only the data dependent information in the loop. The low synchronization cost balances the loss in parallelism due to the reduced overlap between iterations.

When adding explicit synchronization to parallelize loops, even a single extra synchronization operation per iteration can prove to be costly. Therefore, with the aim of keeping synchronization costs to the bare minimum, and for reasons of simplicity, the methods of illustrative embodiments fold all data dependencies in a loop into a single, conservative dependence. This folding leads to one pair of synchronization primitives per loop. This method does not require complicated, multi-stage compile time analysis. This method is simple to implement because this method considers only the data dependent information in the loop. The low synchronization costs of this method balance any loss in parallelism due to reduced overlap between iterations.

Additionally, a novel scheme is presented to implement synchronization required to enforce data dependencies in a DOACROSS loop. The synchronization is based on an iteration vector, which identifies a spatial position in the iteration space of the loop. Multiple iterations executing in parallel have their own iteration vector for synchronization where they update their position in the iteration space. Because no sequential updates to the synchronization variable exist, this method exploits a greater degree of parallelism in a computer program. The iteration executing the dependence sink statement looks up the local iteration vector of the source iteration to determine whether execution should wait or proceed.

The memory requirement for the methods of the illustrative embodiments is small. The memory used is n*m bytes, where "n" is the dimension number of the loop and "m" is the number of threads. Because synchronization is based only on the position in iteration space, this mechanism makes synchronization easy when multiple data dependencies in the loop are folded into a single conservative dependence. Unlike existing methods, the illustrative embodiments are simple and extend seamlessly for loops with larger dimensions.

In a specific embodiment, the aspects of the present invention provide for a computer implemented method, apparatus, and computer usable program code for preparing a loop in a set of loops in computer code for parallel processing. The loop is identified by identifying which loop in the set of loops will, during execution thereof, have an iteration vector bounded by an iteration space of the loop, wherein all data dependencies are contained within the loop. Each data dependency is represented as a corresponding dependency vector $D^k$ having elements $(d^k_1, d^k_2, \ldots d^k_n)$, wherein a set of dependency vectors are formed. The set of dependency vectors is used to compute a result vector C having elements $c_1, c_2, \ldots c_n$). For each corresponding dependency vector in the set dependency vectors that satisfies the equation:

$$\vec{C} = \begin{pmatrix} C[1] \\ C[2 \ldots n] \end{pmatrix}$$
$$= \begin{pmatrix} gcd(d^1_1, d^2_1, \ldots d^k_1) \\ \text{max\_vect}(D^1[2 \ldots n], D^2[2 \ldots n], \ldots D^k[2 \ldots n]) \end{pmatrix}$$

a call to a WAIT(wI) primitive is inserted into the loop immediately prior to a lexically earliest sink statement in the loop. "I" will represent a current value of the loop iteration vector for the loop. (wI) is computed as wI=(I−C). Invocation of the WAIT(wI) primitive, where (wI) is within the iteration space of the loop, will, during execution of the loop, cause a first thread which processed the WAIT(wI) instruction to suspend until invocation by a second thread of a POST(pI) primitive for which pI is equal to or greater than (WI) for a value of (WI) for which the WAIT(wI) primitive was invoked by the first thread. Invocation of the WAIT(wI) primitive, where (wI) is outside the iteration space of the loop, will be ignored. The POST(pI) primitive is inserted into the loop immediately following a lexically latest source statement in the loop, wherein pI=I.

FIG. 4 is an exemplary WAIT algorithm, in accordance with an illustrative embodiment. The WAIT algorithm of FIG. 4 can be implemented in a computer program, particularly in a computer program that contains one or more loops. The WAIT algorithm of FIG. 4 can be implemented in a data processing system, such as data processing system 100 of FIG. 1 and data processing system 200 of FIG. 2. The code shown in FIG. 4 can be inserted into source code using a compiler, such as compiler 302 shown in FIG. 3.

The synchronization variable in the illustrative embodiments is an iteration vector $I_v=(I_1, I_2, \ldots I_n)$. The iteration vector indicates a position in the n-dimensional iteration space of the loop. Each thread "t" in the system owns one synchronization variable, $syncI_v[t][1 \ldots n]$, $t \in \{1 \ldots m\}$, where "m" is the number of threads. This iteration vector definition allows each iteration executing in parallel to have a separate iteration vector.

The illustrative embodiments use two synchronization primitives, identified as WAIT, as shown in FIG. 4, and POST, as shown in FIG. 5. These two synchronization primitives enforce data dependencies in a loop. In the illustrative embodiment shown in FIG. 4 and FIG. 5, a single data dependency exist. Multiple dependencies can be handled by folding all dependencies into a single conservative dependency.

A POST statement is inserted after the source statement of the dependency. The WAIT statement is inserted before the sink statement of the dependency. The POST and WAIT algorithms are illustrated in FIG. 4 and FIG. 5.

The WAIT algorithm of FIG. 4 causes execution of the program to wait until the iteration specified by the iteration vector $wI_v$ is completed. The iteration vector of WAIT is computed using the current iteration vector and the dependence distance vector $D=(d_1, d_2, d_3, \ldots d_n)$. Thus, $wI_v=(I_1-d_1, I_2-d_2, \ldots I_n-d_n)$, where "n" is the dimension of the loop.

The WAIT algorithm shown in FIG. 4 receives input 400 and then executes the process shown in instructions 402. Input 400 is the iteration vector of the dependence source $wI_v=(I_1-d_1, I_2-d_2, \ldots I_n-d_n)$, where "n" is the dimension of the loop. Instructions 402 determine the thread executing the source iteration specified by $wI_v$. Additionally, iterations are assigned using a static schedule with a chunk size equal to one.

FIG. 5 is an exemplary POST algorithm, in accordance with an illustrative embodiment. The POST algorithm of FIG. 5 can be implemented in a computer program, particularly in a computer program that contains one or more loops. The POST algorithm of FIG. 5 can be implemented in a data processing system, such as data processing system 100 of FIG. 1 and data processing system 200 of FIG. 2. The code shown in FIG. 5 can be inserted into source code using a compiler, such as compiler 302 shown in FIG. 3.

As with the WAIT statement in FIG. 4, the synchronization variable in the illustrative embodiments is an iteration vector $I_v=(I_1, I_2, \ldots I_n)$. Each thread "t" in the system owns one synchronization variable, $syncI_v[t][1 \ldots n]$, $t \in \{1 \ldots m\}$. In the POST algorithm shown in FIG. 5, each thread is updating its own synchronization variable. Therefore, no waiting takes place and, no restriction on parallelism is imposed.

The POST statement in FIG. 4 indicates the completion of the iteration specified by the iteration vector $pI_v$. The iteration vector is $pI_v=I_v=(I_1, I_2, \ldots I_n)$, where "n" is the dimension number of the loop.

The POST algorithm shown in FIG. 5 receives input 500 and then executes the process shown in instructions 502. Input 500 is the iteration vector of the current iteration $pI_v=I_v=(I_1, I_2, \ldots I_n)$ Instructions 502 update the synchronization variable of the current thread.

Figure 7:
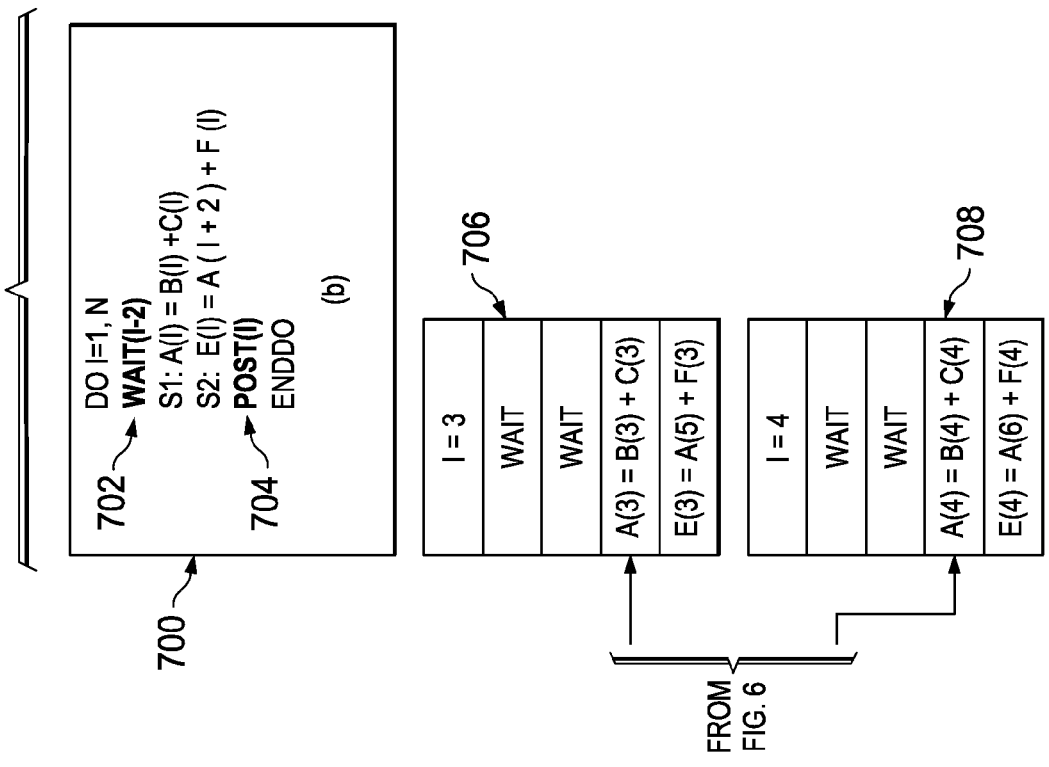
FIG. 7 illustrates pipelined parallelization of the one dimensional loop of FIG. 6, in accordance with an illustrative embodiment.
Figure 6:
FIG. 6 is a one dimensional loop, in which aspects of the present invention may be incorporated.

FIG. 6 is a one dimensional loop, in which aspects of the present invention may be incorporated. FIG. 7 illustrates pipelined parallelization of the one dimensional loop of FIG. 6, in accordance with an illustrative embodiment. The loop shown in FIG. 6 and FIG. 7 can be implemented in a computer program. The loop, the program containing the loop, and the accompanying WAIT and POST algorithms can be implemented in a data processing system, such as data processing system 100 of FIG. 1 and data processing system 200 of FIG. 2. The WAIT and POST algorithms shown in FIG. 7 can be inserted into the loop using a compiler, such as compiler 302 shown in FIG. 3.

Loop 600 is a relatively simple loop that iterates the defined functions S1 602 and S2 604. The anti-dependence is S2 $d_a$ S1. The dependence distance is D=(2). Loop 600 can be expanded to include additional loops and to contain additional functions within any given loop.

As shown in iteration 606, A(1)=B(1)+C(1) and E(1)=A (3)+F(1). As shown in iteration 608, A(2)=B(2)+C(2) and E(2)=A(4)+F(4).

FIG. 7 shows loop 600 into which WAIT statement 702 and POST statement 704 have been inserted, thereby forming loop 700. WAIT statement 702 is WAIT (I−2) and POST statement 704 is POST(I). As a result of WAIT statement 702, the first two iterations wait for the third and fourth iterations. Thus, iteration 606 corresponds to iteration 706 and iteration 608 corresponds to iteration 708. In this manner, the pipelined parallelization of one-dimensional loop 600 is accomplished.

FIG. 8 is a multi-dimensional loop, in which aspects of the present invention may be incorporated. FIG. 9 illustrates pipelined parallelization of the multi-dimensional loop of FIG. 8, in accordance with an illustrative embodiment. The loop shown in FIG. 8 and FIG. 9 can be implemented in a computer program. The loop, the program containing the loop, and the accompanying WAIT and POST algorithms can be implemented in a data processing system, such as data processing system 100 of FIG. 1 and data processing system 200 of FIG. 2. The WAIT and POST algorithms shown in FIG. 9 can be inserted into the loop using a compiler, such as compiler 302 shown in FIG. 3.

A major difference between loop 600 of FIG. 6 and loop 800 of FIG. 8 is that loop 600 is a one dimension loop and loop 800 is a multi-dimensional loop. Loop 800 contains one function, S1 802. The anti-dependence of loop 800 is S1 $d_a$ S1, and the dependence distance is D=(1,0). WAIT statement 902 in loop 900 of FIG. 9 is inserted after the "DO J=1,N" statement. Additionally, POST statement 904 is inserted just after main function statement 906.

Iteration 804 is performed from J=1 to J=5. Individual functions are performed sequentially for each value of J, as shown in iteration 804. A similar pattern occurs for iteration 806, with individual functions in iteration 806 corresponding to individual functions in iteration 804 as shown by arrows 808. In iteration 806, one WAIT occurs.

The individual functions in iteration 908 correspond to individual functions in iteration 806, as shown by arrows 910. However, in iteration 908, two WAITs occur. Similarly, the individual functions in iteration 912 correspond to individual functions in iteration 908, as shown by arrows 914. However, in iteration 912, three WAITs occur.

FIG. 10 is a two-dimensional DOACROSS loop having multiple flow dependencies, in which aspects of the present invention may be incorporated. FIG. 11 illustrates the synchronization primitives inserted into the two-dimensional DOACROSS loop shown in FIG. 10, in accordance with an illustrative embodiment. The loop shown in FIG. 10 and FIG. 11 can be implemented in a computer program. The loop, the program containing the loop, and the accompanying WAIT and POST algorithms can be implemented in a data processing system, such as data processing system 100 of FIG. 1 and data processing system 200 of FIG. 2. The WAIT and POST algorithms shown in FIG. 11 can be inserted into the loop using a compiler, such as compiler 302 shown in FIG. 3.

Loop 1000 is a two-dimensional DOACROSS loop. Loop 1000 and loop 1100 have multiple data dependencies. WAIT statement 1102 and POST statement 1104 are synchronization primitives inserted into loop 1000 using a conservative dependence computation. The purpose of WAIT statement 1102 and POST statement 1104 is to perform pipelined parallelization of multi-dimensional loops with multiple data dependencies.

With respect to FIG. 10 and FIG. 11, a data dependence $\Delta = \{S_{src} \delta^* S_{sink}, \vec{D}\}$ is composed of two parts: 1) source and sink statements and 2) dependence distance. The following notations indicate the type of data dependence: $\delta^f$, which refers to flow dependence, $\delta^a$, which refers to anti-dependence, and $\delta^o$, which refers to output-dependence.

For a perfect loop nest "L" with "n" dimensions, "m" statements $\{S1 \ldots Sm\}$ and "k" data dependencies $\Delta^i = \{S_x \delta^* S_y, D^i\}$, $i \in \{1 \ldots k\}$, $x \in \{1 \ldots m\}$ and $y \in \{1 \ldots m\}$ Each of the "k" dependencies have the following dependence distance vectors:

$$\overrightarrow{D^1} = (d_1^1, d_2^1, \ldots, d_n^1).$$

$$\overrightarrow{D^2} = (d_1^2, d_2^2, \ldots, d_n^2).$$

$$\overrightarrow{D^k} = (d_1^k, d_2^k, \ldots, d_n^k).$$

The conservative dependence is computed by considering all the data dependencies $\Delta^{1 \cdots k}$ in the loop L. In the illustrative embodiments, a relatively simple scheme is used to determine the conservative dependence. The lexically earliest sink statement and the lexically last source statement of all the data dependences in the loop are chosen as sink and source statements of the conservative dependence, respectively.

The next step is to identify the conservative dependence distance vector $\vec{C}$. In this illustrative example, pipelined parallelization applies to only a single level of parallelism in the loop. Therefore, a relatively simple formation for the conservative dependence can be stated as follows:

$$\vec{C} = \begin{pmatrix} C[1] \\ C[2 \ldots n] \end{pmatrix}$$
$$= \begin{pmatrix} gcd(d_1^1, d_1^2, \ldots d_1^k) \\ \max\_vect(D^1[2 \ldots n], D^2[2 \ldots n], \ldots D^k[2 \ldots n]) \end{pmatrix}$$

In this example, max_vect($\vec{V_1}$, $\vec{V_2}$, ...) determines the biggest vector of ($\vec{V_1}$, $\vec{V_2}$, ...).

With respect to loop 1100, two synchronization primitives, WAIT statement 1102 and POST statement 1104 are used to enforce the conservative dependence distance. POST statement 1104 is inserted after the source statement of the dependence. WAIT statement 1102 is inserted before the sink statement of the dependence. Additionally, $I_v = (I_1, I_2, \ldots I_n)$ is an iteration vector in the "n" dimensional iteration space of the loop.

Similar to WAIT algorithm 400 of FIG. 4, WAIT statement 1102 causes execution of the program to wait until the iteration specified by the iteration vector $wI_v$ is completed. The iteration vector of WAIT statement 1102 is computed using the current iteration vector and the conservative dependence distance vector $C = (c_1, c_2, c_3, \ldots c_n)$. Thus, $wI_v = (I_v - C) = (I_1 - c_1, I_2 - c_2, \ldots I_n - c_n)$, where "n" is the dimension of the loop.

Similar to POST algorithm 500 of FIG. 5, POST statement 1104 indicates the completion of the iteration specified by the iteration vector $pI_v$. The iteration vector $(pI_v)$ of POST statement 1104 is the current iteration that the thread is executing. In this illustrative example, $pI_v = I_v = (I_1, I_2, \ldots I_n)$. Additionally, the following statements can be made:

$s1[i,j] \delta^f s2[i-2, j-1], \overrightarrow{D^1} = (2,1)$ for array A $s1[i,j] \delta^f s3[i-4, j-4], \overrightarrow{D^2} = (4,4)$ for array A $s2[i,j] \delta^f s4[i-3, j], \overrightarrow{D^3} = (3,0)$ for array D The source of the conservative dependence is s1 1106, which is lexically the last source. In this example, s1 1106 is the same as s1 1002 in FIG. 10. The sink is s2 1108, which is the lexically earliest sink. In this example, s2 1108 is the same as s2 1004 in FIG. 10.

POST statement 1104 is inserted after source statement s1 1106 of the conservative dependence. WAIT statement 1102 is inserted before sink statement s2 1108 of the conservative dependence. The parameters of WAIT statement 1102 include the conservative dependence distance $wI_v =$ $$I_v - \vec{C}, \text{ where}$$
$$\vec{C} = \begin{pmatrix} gcd(2, 4, 3) \\ \max(1, 4, 0) \end{pmatrix} = \begin{pmatrix} 1 \\ 4 \end{pmatrix}.$$

In this illustrative example, this statement also can be expressed as $wI_v = (I-1, J-4)$.

Figure 12:
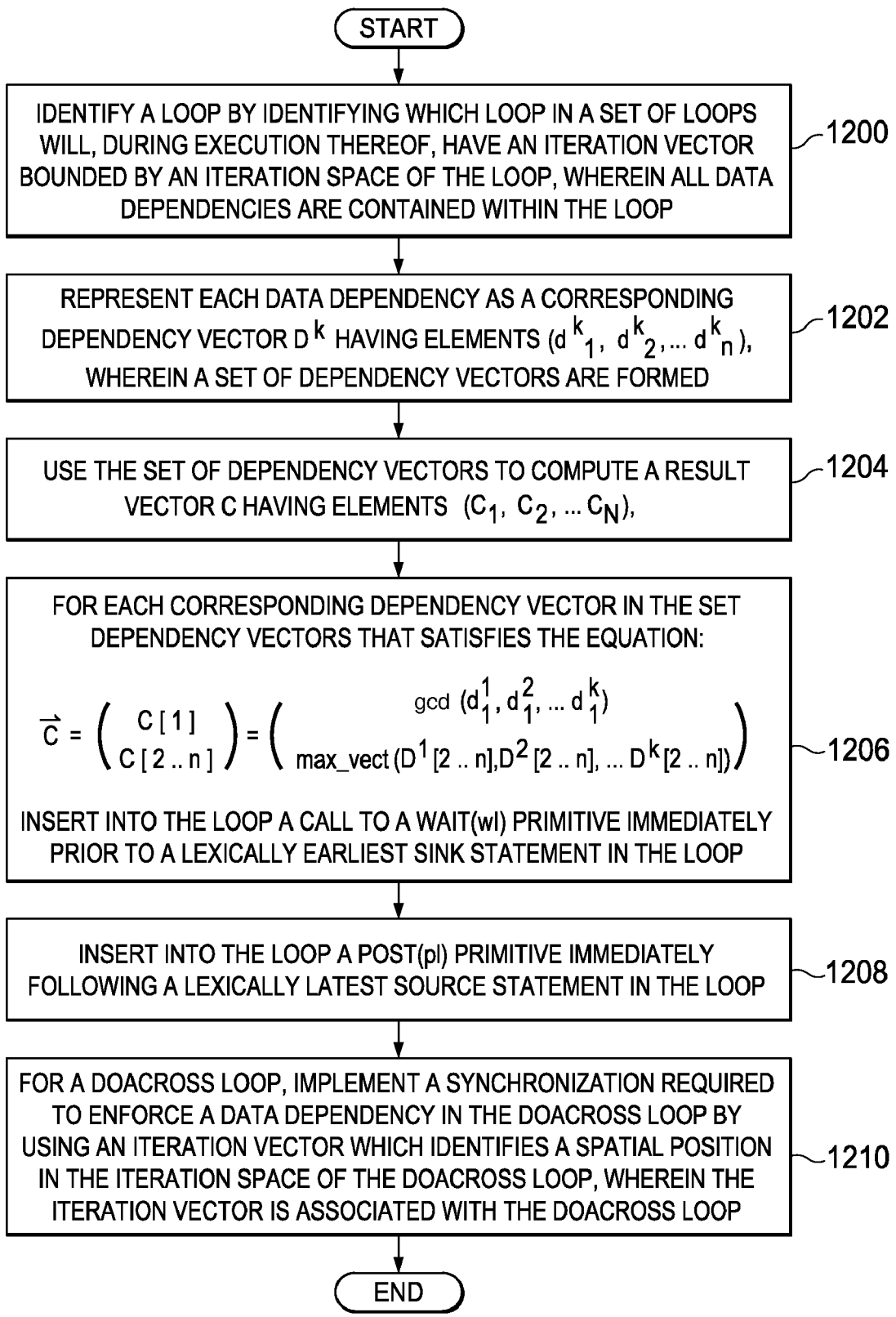
FIG. 12 is a flowchart illustrating a method for preparing a loop in a set of loops in computer code for parallel processing, in accordance with an illustrative embodiment.

FIG. 12 is a flowchart illustrating a method for preparing a loop in a set of loops in computer code for parallel processing, in accordance with an illustrative embodiment. The process shown in FIG. 12 can be implemented in a data processing system, such as data processing system 100 shown in FIG. 1 and data processing system 200 shown in FIG. 2. Additionally, the process shown in FIG. 12 can be implemented in a compiler, such as compiler 302 shown in FIG. 3.

The process begins as the compiler identifies a loop by identifying which loop in a set of loops will, during execution thereof, have an iteration vector bounded by an iteration space of the loop, wherein all data dependencies are contained within the loop (step 1200). The compiler then represents each data dependency as a corresponding dependency vector $D^k$ having elements $(d_1^k, d_2^k, \ldots d_n^k)$, wherein a set of dependency vectors are formed (step 1202). The compiler then uses the set of dependency vectors to compute a result vector C having elements $(c_1, c_2, \ldots c_n)$ (step 1204).

For each corresponding dependency vector in the set dependency vectors that satisfies the equation:

$$\vec{C} = \begin{pmatrix} C[1] \\ C[2 \ldots n] \end{pmatrix}$$
$$= \begin{pmatrix} gcd(d_1^1, d_1^2, \ldots d_1^k) \\ \max\_vect(D^1[2 \ldots n], D^2[2 \ldots n], \ldots D^k[2 \ldots n]) \end{pmatrix}$$

the compiler inserts into the loop a call to a WAIT(wI) primitive immediately prior to a lexically earliest sink statement in the loop (step 1206). In this case, "I" will represent a current value of the loop iteration vector for the loop. (wI) is computed as wI=(I−C). Invocation of the WAIT(wI) primitive, where (wI) is within the iteration space of the loop, will, during execution of the loop, cause a first thread which processed the WAIT(wI) instruction to suspend until invocation by a second thread of a POST(pI) primitive for which (pI) is equal to or greater than (wI) for a value of (wI) for which the WAIT(wI) primitive was invoked by the first thread. However, invocation of the WAIT(wI) primitive, where (WI) is outside the iteration space of the loop, will be ignored.

In an illustrative example, the compiler takes the final step of inserting into the loop the POST(pI) primitive immediately following a lexically latest source statement in the loop, wherein pI=I (step 1208). However, step 1208 need not be the final step.

In an illustrative example, the WAIT(wI) primitive will, when invoked during execution of the loop, check a thread iteration vector for the second thread. The value of the thread iteration vector for the second thread will, during execution of the loop, be stored by invocation of the POST(pI) primitive by the second thread. The WAIT(wI) primitive will, responsive to a determination during execution of the loop that the thread iteration vector for the second thread is equal to or greater than the value of (wI) for which the WAIT(wI) primitive was invoked by the first thread, permit the first thread to resume execution of the loop.

In another illustrative example, for multi-dimensional loops, the compiler can perform an additional step. In this example, the compiler implements a synchronization required to enforce a data dependency in the DOACROSS loop by using an iteration vector which identifies a spatial position in the iteration space of the DOACROSS loop, wherein the iteration vector is associated with the DOACROSS loop (step 1210). The process terminates thereafter.

The invention can take the form of an entirely hardware embodiment, an entirely software embodiment or an embodiment containing both hardware and software elements. In a preferred embodiment, the invention is implemented in software, which includes, but is not limited to, firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible, physical apparatus that can contain, store, or transport the program for use by or in connection with the instruction execution system, apparatus, or device.

The medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited to, keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer-implemented method for preparing a loop in a set of loops in computer code for parallel processing, the computer-implemented method comprising:

identifying the loop by identifying which loop in the set of loops will, during execution thereof, have an iteration vector bounded by an iteration space of the loop, wherein all data dependencies are contained within the loop;

representing each data dependency as a corresponding dependency vector $D^k$ having elements $(d^k_1, d^k_2, \ldots d^k_n)$, wherein a set of dependency vectors are formed;

using the set of dependency vectors to compute a result vector C having elements $c_1, c_2, \ldots c_n$);

for each corresponding dependency vector in the set of dependency vectors that satisfies the equation:

$$\vec{C} = \begin{pmatrix} C[1] \\ C[2 \ldots n] \end{pmatrix} = \begin{pmatrix} gcd(d^1_1, d^2_1, \ldots d^k_1) \\ \max\_vect(D^1[2 \ldots n], D^2[2 \ldots n], \ldots D^k[2 \ldots n]) \end{pmatrix}$$

inserting into the loop a call to a WAIT(wI) primitive immediately prior to a lexically earliest sink statement in the loop, wherein:

"I" will represent a current value of the loop iteration vector for the loop;

(wI) is computed as wI=(I−C);

invocation of the WAIT(wI) primitive, where (wI) is within the iteration space of the loop, will, during execution of the loop, cause a first thread which processed the WAIT (wI) instruction to suspend until invocation by a second thread of a POST(pI) primitive for which pI is equal to or greater than wI for a value of (wI for which the WAIT (wI) primitive was invoked by the first thread;

invocation of the WAIT(wI) primitive, where (wI) is outside the iteration space of the loop, will be ignored; and inserting into the loop the POST(pI) primitive immediately following a lexically latest source statement in the loop, wherein pI=I.

2. The computer-implemented method of claim 1, wherein:

the WAIT(wI) primitive will, when invoked during execution of the loop, check a thread iteration vector for the second thread;

the value of the thread iteration vector for the second thread will, during execution of the loop, be stored by invocation of the POST(pI) primitive by the second thread; and the WAIT(wI) primitive will, responsive to a determination during execution of the loop that the thread iteration vector for the second thread is equal to or greater than the value of (wI) for which the WAIT(wI) primitive was invoked by the first thread, permit the first thread to resume execution of the loop.

3. The computer-implemented method of claim 1 wherein the loop is a DOACROSS loop, and wherein the DOACROSS loop is a multi-dimensional loop.

4. The computer-implemented method of claim 3 further comprising:
implementing a synchronization required to enforce a data dependency in the DOACROSS loop by using an iteration vector which identifies a spatial position in the iteration space of the DOACROSS loop, wherein the iteration vector is associated with the DOACROSS loop.

5. The computer-implemented method of claim 4 wherein an iteration executing a dependence sink statement looks up the iteration vector to determine whether the iteration should perform one of wait or proceed.

6. The computer-implemented method of claim 5 wherein the iteration vector comprises an equation defined by $I_v=(I_1, I_2, \ldots I_n)$, wherein the equation indicates a position in an n-dimensional iteration space of the loop.

7. The computer-implemented method of claim 6 wherein each thread, "t", executing on a computer owns one synchronization variable that allows each iteration executing in parallel to have a separate iteration vector.

8. The computer-implemented method of claim 7 wherein the synchronization variable comprises: $syncI_v[t][1 \ldots n]$, $t \in \{1 \ldots m\}$, wherein "m" is a number of threads executing.

9. The computer-implemented method of claim 1 wherein the WAIT primitive and the POST primitive enforce a data dependency in the loop.

10. The computer-implemented method of claim 9 wherein the loop includes a plurality of data dependencies, and wherein the plurality of data dependencies are folded into a single conservative dependence.

11. A computer program product comprising:
a computer usable medium having computer usable program code for preparing a loop in a set of loops in computer code for parallel processing, the computer program product including:
computer usable program code for identifying the loop by identifying which loop in the set of loops will, during execution thereof, have an iteration vector bounded by an iteration space of the loop, wherein all data dependencies are contained within the loop;
computer usable program code for representing each data dependency as a corresponding dependency vector $D^k$ having elements $(d^k_1, d^k_2, \ldots d^k_n)$, wherein a set of dependency vectors are formed;
computer usable program code for using the set of dependency vectors to compute a result vector C having elements $c_1, c_2, \ldots c_n$);
computer usable program code for, for each corresponding dependency vector in the set of dependency vectors that satisfies the equation:

$$\vec{C} = \begin{pmatrix} C[1] \\ C[2 \ldots n] \end{pmatrix}$$

$$= \begin{pmatrix} gcd(d^1_1, d^2_1, \ldots d^k_1) \\ \max\_vect(D^1[2 \ldots n], D^2[2 \ldots n], \ldots D^k[2 \ldots n]) \end{pmatrix}$$

inserting into the loop a call to a WAIT(wI) primitive immediately prior to a lexically earliest sink statement in the loop, wherein:
"I" will represent a current value of the loop iteration vector for the loop;
(wI) is computed as wI=(I−C);
invocation of the WAIT(wI) primitive, where (wI) is within the iteration space of the loop, will, during execution of the loop, cause a first thread which processed the WAIT (wI) instruction to suspend until invocation by a second thread of a POST(pI) primitive for which pI is equal to or greater than wI for a value of (wI for which the WAIT (wI) primitive was invoked by the first thread; and
invocation of the WAIT(wI) primitive, where (wI) is outside the iteration space of the loop, will be ignored; and
computer usable program code for inserting into the loop the POST(pI) primitive immediately following a lexically latest source statement in the loop, wherein pI=I.

12. The computer program product of claim 11, wherein:
the WAIT(wI) primitive will, when invoked during execution of the loop, check a thread iteration vector for the second thread;
the value of the thread iteration vector for the second thread will, during execution of the loop, be stored by invocation of the POST(pI) primitive by the second thread; and
the WAIT(wI) primitive will, responsive to a determination during execution of the loop that the thread iteration vector for the second thread is equal to or greater than the value of (wI) for which the WAIT(wI) primitive was invoked by the first thread, permit the first thread to resume execution of the loop.

13. The computer program product of claim 11 wherein the loop is a DOACROSS loop, and wherein the DOACROSS loop is a multi-dimensional loop.

14. The computer program product of claim 13 further comprising:
implementing a synchronization required to enforce a data dependency in the DOACROSS loop by using an iteration vector which identifies a spatial position in the iteration space of the DOACROSS loop, wherein the iteration vector is associated with the DOACROSS loop.

15. The computer program product of claim 14 wherein an iteration executing a dependence sink statement looks up the iteration vector to determine whether the iteration should perform one of wait or proceed.

16. The computer program product of claim 15 wherein the iteration vector comprises an equation defined by $I_v=(I_1, I_2, \ldots I_n)$ wherein the equation indicates a position in an n-dimensional iteration space of the loop.

17. The computer program product of claim 16 wherein each thread, "t", executing on a computer owns one synchronization variable that allows each iteration executing in parallel to have a separate iteration vector.

18. The computer program product of claim 17 wherein the synchronization variable comprises: $syncI_v[t][1 \ldots n]$, $t \in \{1 \ldots m\}$, wherein "m" is a number of threads executing.

19. A data processing system comprising:
a bus;
at least one processor coupled to the bus;
a computer usable medium coupled to the bus, wherein the computer usable medium contains a set of instructions for preparing a loop in a set of loops in computer code for parallel processing, wherein the at least one processor is adapted to carry out the set of instructions to:

identify the loop by identifying which loop in the set of loops will, during execution thereof, have an iteration vector bounded by an iteration space of the loop, wherein all data dependencies are contained within the loop;

represent each data dependency as a corresponding dependency vector $D^k$ having elements $(d^k_1, d^k_2, \ldots d^k_n)$, wherein a set of dependency vectors are formed;

use the set of dependency vectors to compute a result vector C having elements $c_1, c_2, \ldots c_n$);

for each corresponding dependency vector in the set of dependency vectors that satisfies the equation:

$$\vec{C} = \begin{pmatrix} C[1] \\ C[2 \ldots n] \end{pmatrix} = \begin{pmatrix} gcd(d_1^1, d_1^2, \ldots d_1^k) \\ \max\_vect(D^1[2 \ldots n], D^2[2 \ldots n], \ldots D^k[2 \ldots n]) \end{pmatrix}$$

insert into the loop a call to a WAIT(wI) primitive immediately prior to a lexically earliest sink statement in the loop, wherein:

"I" will represent a current value of the loop iteration vector for the loop;

(wI) is computed as wI=(I−C);

invocation of the WAIT(wI) primitive, where (wI) is within the iteration space of the loop, will, during execution of the loop, cause a first thread which processed the WAIT (wI) instruction to suspend until invocation by a second thread of a POST(pI) primitive for which pI is equal to or greater than wI for a value of (wI for which the WAIT (wI) primitive was invoked by the first thread;

invocation of the WAIT(wI) primitive, where (wI) is outside the iteration space of the loop, will be ignored; and insert into the loop the POST(pI) primitive immediately following a lexically latest source statement in the loop, wherein pI=I.

20. The data processing system of claim 19, wherein:

the WAIT(wI) primitive will, when invoked during execution of the loop, check a thread iteration vector for the second thread;

the value of the thread iteration vector for the second thread will, during execution of the loop, be stored by invocation of the POST(pI) primitive by the second thread; and the WAIT(wI) primitive will, responsive to a determination during execution of the loop that the thread iteration vector for the second thread is equal to or greater than the value of (wI) for which the WAIT(wI) primitive was invoked by the first thread, permit the first thread to resume execution of the loop.

* * * * *